(12) United States Patent
Kawai

(10) Patent No.: US 10,784,537 B2
(45) Date of Patent: Sep. 22, 2020

(54) LITHIUM ION SECONDARY BATTERY

(71) Applicant: TOYOTA JIDOSHA KABUSHIKI KAISHA, Toyota-shi, Aichi (JP)

(72) Inventor: Toshiyuki Kawai, Nagoya (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 152 days.

(21) Appl. No.: 15/851,939

(22) Filed: Dec. 22, 2017

(65) Prior Publication Data

US 2018/0183103 A1 Jun. 28, 2018

(30) Foreign Application Priority Data

Dec. 27, 2016 (JP) .................... 2016-252854

(51) Int. Cl.

| H01M 10/0567 | (2010.01) |
|---|---|
| H01M 10/0525 | (2010.01) |
| H01M 10/0569 | (2010.01) |
| H01M 10/0562 | (2010.01) |
| H01M 4/38 | (2006.01) |

(Continued)

(52) U.S. Cl.
CPC ....... H01M 10/0567 (2013.01); H01M 4/382 (2013.01); H01M 4/62 (2013.01); H01M 10/0525 (2013.01); H01M 10/0562 (2013.01); H01M 10/0569 (2013.01); H01M 4/525 (2013.01); H01M 2004/021 (2013.01); H01M 2004/028 (2013.01); H01M 2220/20 (2013.01); H01M 2300/0034 (2013.01); H01M 2300/0037 (2013.01)

(58) Field of Classification Search
CPC ............ H01M 10/0567; H01M 4/62; H01M 10/0525; H01M 4/382; H01M 10/0562; H01M 10/0569; H01M 4/525; H01M 2004/021; H01M 2300/0037; H01M 2004/028; H01M 2300/0034; H01M 2220/20
See application file for complete search history.

(56) References Cited

U.S. PATENT DOCUMENTS

2015/0180036 A1* 6/2015 Takebayashi .......... H01M 4/13
429/319
2015/0287537 A1 10/2015 Onagi et al.
(Continued)

FOREIGN PATENT DOCUMENTS

| JP | 2012-169138 A | 9/2012 |
|---|---|---|
| JP | 2014-103098 A | 6/2014 |

(Continued)

Primary Examiner — Cynthia K Walls
(74) Attorney, Agent, or Firm — Sughrue Mion, PLLC

(57) ABSTRACT

Provided is a lithium ion secondary battery with reduced battery resistance, this lithium ion secondary battery using a positive electrode active material with a high potential and a phosphate-based solid electrolyte. The lithium ion secondary battery disclosed herein includes a positive electrode, a negative electrode, and a nonaqueous electrolytic solution. The positive electrode has a positive electrode active material layer including a positive electrode active material having an operation upper limit potential of at least 4.6 V relative to metallic lithium and a phosphate-based solid electrolyte. The nonaqueous electrolytic solution includes a boric acid ester including a fluorine atom.

3 Claims, 2 Drawing Sheets

(51) Int. Cl.
*H01M 4/62* (2006.01)
*H01M 4/02* (2006.01)
*H01M 4/525* (2010.01)

(56) References Cited

U.S. PATENT DOCUMENTS

2015/0311563 A1 10/2015 Abe et al.
2017/0309954 A1* 10/2017 Gogyo .................. H01M 4/485

FOREIGN PATENT DOCUMENTS

| | | | | |
|---|---|---|---|---|
| JP | 2015210893 A | 11/2015 | | |
| JP | 2016-76411 A | 5/2016 | | |
| KR | 10-2015-0083870 A | 7/2015 | | |
| WO | WO 2016/060253 | * 4/2016 | ........ | H01M 10/0525 |
| WO | 2016/171276 A1 | 10/2016 | | |

* cited by examiner

LITHIUM ION SECONDARY BATTERY

BACKGROUND OF THE INVENTION

1. Field of the Invention

The present teaching relates to a lithium ion secondary battery. The present application claims priority based on Japanese Patent Application No. 2016-252854 filed on Dec. 27, 2016, the entire contents of which are incorporated herein by reference.

2. Description of the Related Art

Lithium ion secondary batteries are low in weight and make it possible to obtain a high energy density. For this reason, such batteries have been widely used as the so-called portable power sources for personal computers or portable terminals and also as drive power sources for vehicles. Lithium ion secondary batteries are expected to become increasingly popular in the future as a high-output power source for driving vehicles such as electric vehicles (EV), hybrid vehicles (HV), plug-in hybrid vehicles (PHV) and the like.

Lithium ion secondary batteries used for a high-output power source for driving a vehicle are required to have higher performance, and increasing energy density has been attempted to achieve higher performance. One method for increasing the energy density of a lithium ion secondary battery is to use a positive electrode active material having a high operation upper limit potential (that is, a high-potential positive electrode active material).

Meanwhile, it is known that the properties of a lithium ion secondary battery deteriorate due to decomposition of a nonaqueous electrolytic solution. This decomposition of the nonaqueous electrolytic solution tends to occur easier at a higher operation upper limit potential of a positive electrode active material. For this reason, various techniques for suppressing deterioration of properties caused by decomposition of nonaqueous electrolytic solution have been developed.

As an example thereof, Japanese Patent Application Publication No. 2014-103098 suggests a technique for adding an inorganic phosphate as a phosphate-based solid electrolyte to a positive electrode active material layer in a lithium ion secondary battery having the operation upper limit potential of a positive electrode of at least 4.3 V. According to the technique described in Japanese Patent Application Publication No. 2014-103098, the phosphate-based solid electrolyte functions as an acid-consuming material by reacting with an acid generated by oxidative decomposition of the nonaqueous electrolytic solution. Therefore, by using the phosphate-based solid electrolyte, elution of a transition metal from the positive electrode active material by the acid is suppressed, and capacity deterioration caused by the elution of the transition metal can be suppressed.

SUMMARY OF THE INVENTION

However, based on the results of intensive research by the present inventor, it was found out that although the capacity deterioration of the lithium ion secondary battery occurring when charge and discharge cycles are repeated can be suppressed by the technique described in Japanese Patent Application Publication No. 2014-103098, the battery resistance increases. Where the battery resistance is high, the input/output properties are deteriorated, so it is desirable that the battery resistance be low.

Accordingly, an object of the present teaching is to provide a lithium ion secondary battery with reduced battery resistance, the lithium ion secondary battery using a positive electrode active material with a high potential and a phosphate-based solid electrolyte.

The lithium ion secondary battery disclosed herein includes a positive electrode, a negative electrode, and a nonaqueous electrolytic solution. The positive electrode has a positive electrode active material layer including a positive electrode active material having an operation upper limit potential of at least 4.6 V relative to metallic lithium and a phosphate-based solid electrolyte. The nonaqueous electrolytic solution includes a boric acid ester including a fluorine atom.

With such a configuration, it is possible to improve the ionic conductivity of the phosphate-based solid electrolyte. As a result, it is possible to provide a lithium ion secondary battery with reduced battery resistance, the lithium ion secondary battery using the positive electrode active material with a high potential and the phosphate-based solid electrolyte.

In a desired embodiment of the lithium ion secondary battery disclosed herein, a molar ratio of the boric acid ester including a fluorine atom to the phosphate-based solid electrolyte is at least 0.05 and not more than 3.

With such a configuration, capacity deterioration of the lithium ion secondary battery can be further suppressed.

In a desired embodiment of the lithium ion secondary battery disclosed herein, the boric acid ester including a fluorine atom is at least one selected from the group consisting of tris(2,2,2-trifluoroethyl)borate and tris(hexafluoroisopropyl)borate.

With such a configuration, the battery resistance reduction effect is particularly high.

In a desired embodiment of the lithium ion secondary battery disclosed herein, the nonaqueous electrolytic solution includes a fluorinated carbonate as a nonaqueous solvent.

With such a configuration, oxidative decomposition of the nonaqueous electrolytic solution can be further suppressed.

DESCRIPTION OF THE PREFERRED EMBODIMENTS

Figure 1:
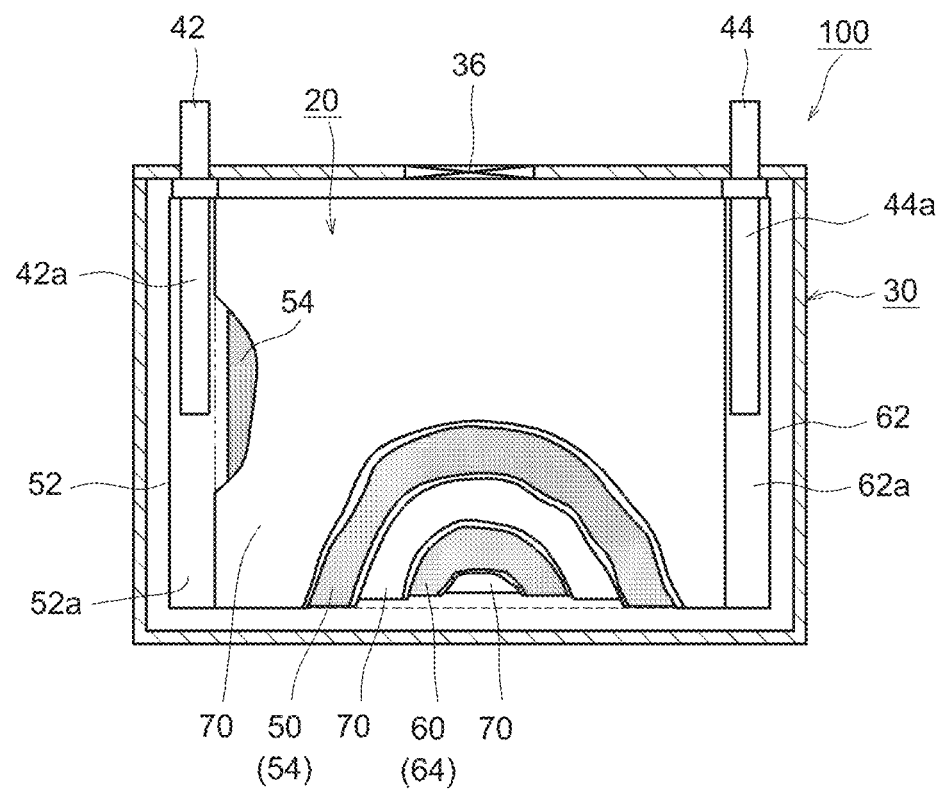
FIG. 1 is a cross-sectional view schematically showing the internal structure of a lithium ion secondary battery according to one embodiment of the present teaching.

Embodiments of the present teaching will be described below with reference to the drawings. Incidentally, matters other than those specifically mentioned in the present specification and necessary for the implementation of the present teaching (for example, the general configuration and production process of a lithium ion secondary battery which do not characterize the present teaching) can be considered as design matters for a person skilled in the art that are based on the conventional techniques in the pertinent field. The present teaching can be carried out based on the contents disclosed in this description and technical common sense in the pertinent field. In addition, in the following drawings, the same reference numerals are attached to members and parts that exhibit the same action. Further, the dimensional relationship (length, width, thickness, etc.) in each drawing does not reflect the actual dimensional relationship.

In this description, the term "secondary battery" generally refers to a power storage device that can be repeatedly charged and discharged, and is a term inclusive of a power storage element such as the so-called storage battery and electric double layer capacitor.

In addition, in the present specification, the term "lithium ion secondary battery" refers to a secondary battery which uses lithium ions as a charge carrier and in which charging and discharging are realized by charge transfer by lithium ions between the positive and negative electrode.

Hereinafter, the present teaching will be described in detail by taking a flat angular lithium ion secondary battery having a flat wound electrode body and a flat battery case as an example, but the present teaching is not intended to be limited to that described in the embodiment.

A lithium ion secondary battery 100 shown in FIG. 1 is a sealed lithium ion secondary battery 100 constructed by accommodating a flat wound electrode body 20 and a nonaqueous electrolytic solution (not shown) in a flat angular battery case (that is, an outer case) 30. The battery case 30 is provided with a positive electrode terminal 42 and a negative electrode terminal 44 for external connection and a thin safety valve 36 which is set so as to release the internal pressure when the internal pressure of the battery case 30 rises to at least a predetermined level. Further, the battery case 30 is provided with an injection port (not shown) for injecting the nonaqueous electrolytic solution. The positive electrode terminal 42 is electrically connected to a positive electrode current collecting plate 42a. The negative electrode terminal 44 is electrically connected to a negative electrode current collecting plate 44a. For example, a lightweight metal material having good thermal conductivity such as aluminum is used for the battery case 30.

Figure 2:
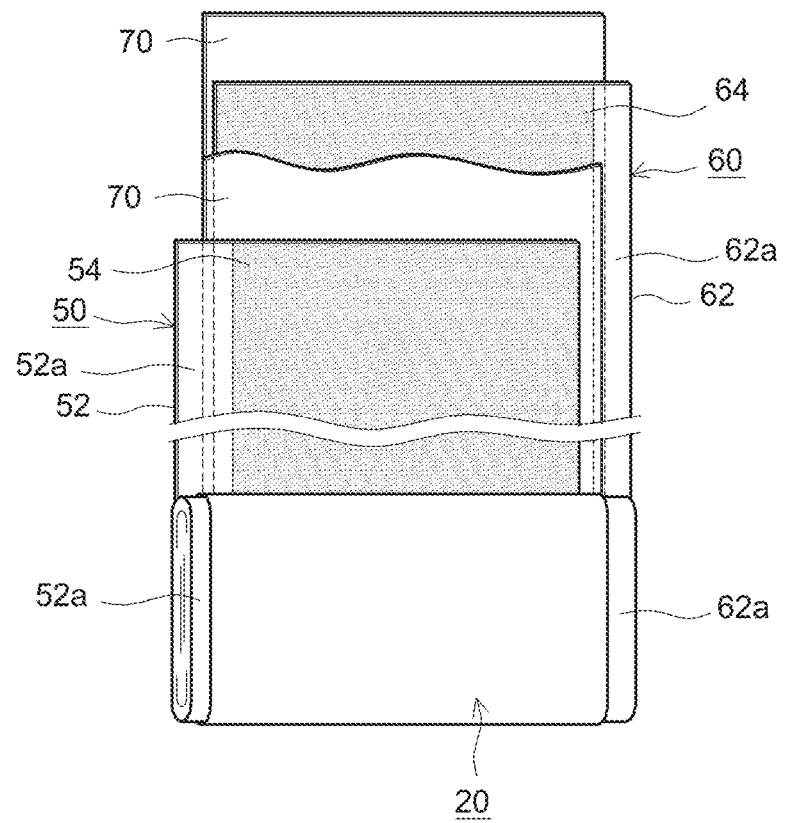
FIG. 2 is a schematic diagram showing the configuration of a wound electrode body of a lithium ion secondary battery according to one embodiment of the present teaching.

As shown in FIGS. 1 and 2, the wound electrode body 20 has a structure in which a positive electrode sheet 50 in which a positive electrode active material layer 54 is formed along the longitudinal direction on one side or both sides (here, both sides) of an elongated positive electrode current collector 52 and a negative electrode sheet 60 in which a negative electrode active material layer 64 is formed along the longitudinal direction on one side or both sides (here, both sides) of an elongated negative electrode current collector 62 are laminated, with two elongated separator sheets 70 being interposed therebetween, and wound in the longitudinal direction. The positive electrode current collecting plate 42a and the negative electrode current collecting plate 44a are joined, respectively, to a positive electrode active material layer non-forming portion 52a (that is, a portion where the positive electrode active material layer 54 is not formed and the positive electrode current collector 52 is exposed) and a negative electrode active material layer non-forming portion 62a (that is, a portion where the negative electrode active material layer 64 is not formed and the negative electrode current collector 62 is exposed) which are formed so as to protrude outward from both ends in the winding axis direction (which is a sheet width direction orthogonal to the longitudinal direction) of the wound electrode body 20.

The positive electrode current collector 52 constituting the positive electrode sheet 50 can be exemplified by an aluminum foil or the like. The positive electrode active material layer 54 includes a positive electrode active material and a phosphate-based solid electrolyte.

For the positive electrode active material contained in the positive electrode active material layer 54, a positive electrode active material with an operation upper limit potential of at least 4.6 V relative to metallic lithium (vs. Li/Li$^+$) is used. In a lithium ion secondary battery using such a high-potential positive electrode active material, decomposition of a nonaqueous electrolytic solution is likely to occur. For this reason, it is of major significance that the positive electrode active material is used in combination with a phosphate-based solid electrolyte having an effect of suppressing capacity deterioration.

Desirable examples of the positive electrode active material include lithium nickel manganese composite oxides having a spinel type crystal structure. The composite oxide may further contain a metal element other than lithium, nickel and manganese. Desirably, the composite oxide has an average composition represented by $Li_xNi_aMn_{2-a-b}Me_bO_4$ (in the formula, x, a, and b fulfil the conditions $0.9<x<1.3$, $0.4<a<0.6$, and $0 \leq b<0.2$, Me is at least one element selected from the group consisting of Ti, Fe, Al, Si, Mg, Ca, Ba, Sr, Sc, V, Cr, Co, Cu, Zn, Ga, Y, Ru, Rh, Pd, In, Sn, Sb, La, Ce, Sm, Zr, Nb, Ta, Mo, W, B, C, P, and S), and particularly desirable the composition represented by $LiNi_{0.5}Mn_{1.5}O_4$. However, the positive electrode active material used in the present embodiment is not limited to the lithium nickel manganese composite oxide having a spinel type crystal structure as long as the operation upper limit potential is at least 4.6 V relative to metallic lithium.

Further, "the positive electrode active material with an operation upper limit potential of at least 4.6 V relative to metallic lithium" refers to a positive electrode active material in which an oxidation-reduction potential (operation potential) is at least 4.6 V (vs. Li/Li$^+$) within the range of SOC (State of Charge) of the lithium ion secondary battery 100 of 0% to 100%. The lithium ion secondary battery 100 including this positive electrode active material has a region in which the potential of the positive electrode (equal to the potential of the positive electrode active material) is at least 4.6 V (vs. Li/Li$^+$) within the range of SOC 0% to 100%.

The operation upper limit potential of the positive electrode active material is desirably at least 4.7 V, and more desirably at least 4.8 V. Meanwhile, the operation upper limit potential of the positive electrode active material is desirably not more than 5.5 V, and more desirably not more than 5.3 V.

As the phosphate-based solid electrolyte, an inorganic phosphate can be suitably used. Examples of inorganic phosphates include alkali metal salts or Group 2 element salts of phosphoric acid or pyrophosphoric acid. Examples of alkali metals include lithium, sodium, potassium and the like. Examples of Group 2 elements include magnesium, calcium, strontium, barium and the like. The inorganic phosphate may include elements other than alkali metals and Group 2 elements, such as aluminum and germanium. Examples of such inorganic phosphates include lithium-aluminum-germanium-phosphate ($Li_{1.5}Al_{0.5}Ge_{1.5}(PO_4)_3$). As the phosphate-based solid electrolyte, lithium phosphate ($Li_3PO_4$) and $Li_{1.5}Al_{0.5}Ge_{1.5}(PO_4)_3$ are desirable because of excellent lithium conductivity thereof, and $Li_3PO_4$ is more desirable.

The positive electrode active material layer 54 may include components other than the positive electrode active material and the phosphate-based solid electrolyte, for example, a conductive material and a binder. As the conductive material, for example, carbon black such as acetylene black (AB) or other carbon materials (for example, graphite) can be suitably used. As the binder, for example, polyvinylidene fluoride (PVdF) can be used.

The amount of the positive electrode active material in the positive electrode active material layer is desirably at least 70% by mass, more desirably from 80% by mass to 95% by mass. The proportion of the conductive material in the positive electrode active material layer is desirably from 1% by mass to 15% by mass, and more desirably from 6% by mass to 14% by mass. The proportion of the binder in the positive electrode active material layer is desirably from 0.1% by mass to 10% by mass, and more desirably from 0.1% by mass to 4% by mass. The phosphate-based solid electrolyte is contained desirably in an amount of 0.01% by mass to 20% by mass, more desirably 0.1% by mass to 10% by mass, and even more desirably 1% by mass to 5% by mass with respect to the positive electrode active material.

The negative electrode current collector 62 constituting the negative electrode sheet 60 can be exemplified by a copper foil or the like. As the negative electrode active material contained in the negative electrode active material layer 64, a carbon material such as graphite, hard carbon, or soft carbon can be used. The negative electrode active material layer 64 may contain components other than the active material, such as a binder and a thickener. As the binder, for example, styrene butadiene rubber (SBR) can be used. As the thickener, for example, carboxymethyl cellulose (CMC) can be used.

The amount of the negative electrode active material in the negative electrode active material layer is desirably at least 90% by mass, and more desirably from 95% by mass to 99% by mass. The amount of the binder in the negative electrode active material layer is desirably from 0.1% by mass to 8% by mass, and more desirably from 0.5% by mass to 3% by mass. The amount of the thickener in the negative electrode active material layer is desirably from 0.3% by mass to 3% by mass, and more desirably from 0.5% by mass to 2% by mass.

The separator 70 can be exemplified by a porous sheet (film) made of a resin such as polyethylene (PE), polypropylene (PP), polyester, cellulose, or polyamide. Such a porous sheet may have a monolayer structure or a laminate structure of two or more layers (for example, a three layer structure in which a PP layer is laminated on both surfaces of a PE layer). On the surface of the separator 70, a heat-resistant layer (HRL) may be provided.

The nonaqueous electrolytic solution typically includes an organic solvent (nonaqueous solvent) and a supporting salt.

Various organic solvents such as carbonates, ethers, esters, nitriles, sulfones, and lactones usable as an electrolytic solution of a general lithium ion secondary battery can be used without particular limitation as the nonaqueous solvent. Among these, fluorinated carbonates are desirable because oxidative decomposition of the nonaqueous electrolytic solution is unlikely to occur. Examples of the fluorinated carbonates include fluorinated cyclic carbonates such as monofluoroethylene carbonate (MFEC), difluoroethylene carbonate (DFEC) and trifluoropropylene carbonate (TFPC); and fluorinated linear carbonates such as methyltrifluoroethyl carbonate (MTFEC), ethyltrifluoroethyl carbonate (ETEC), monofluoromethyl difluoromethyl carbonate (F-DMC), and trifluorodimethyl carbonate (TFDMC). These can be used singly or in combination of two or more thereof.

As the supporting salt, for example, a lithium salt such as $LiPF_6$, $LiBF_4$, or $LiCO_4$ (desirably LiPFE) can be suitably used. The concentration of the supporting salt is desirably at least 0.7 mol/L and not more than 1.3 mol/L.

Further, in the present embodiment, the nonaqueous electrolytic solution includes a boric acid ester including a fluorine atom (hereinafter also referred to as "fluorine-containing boric acid ester"). The fluorine-containing boric acid ester is a boric acid ester including a fluorine atom in an alcohol residue. When the nonaqueous electrolytic solution includes the fluorine-containing boric acid ester, battery resistance of the lithium ion secondary battery 100 using the positive electrode active material and the phosphate-based solid electrolyte can be reduced. The following reason therefor can be suggested. Since the fluorine-containing boric acid ester includes a fluorine atom in the alcohol residue, it is easily decomposed to generate an acid. Therefore, a coating film is formed on the phosphate-based solid electrolyte by a reaction of the acid generated by oxidative decomposition of the nonaqueous electrolytic solution, the acid generated by decomposition of the fluorine-containing boric acid ester, and the phosphate-based solid electrolyte. This coating film has a resistance lower than that of the coating film formed by the reaction of the acid generated by the oxidative decomposition of the nonaqueous electrolytic solution and the phosphate-based solid electrolyte, and the ionic conductivity of the phosphate-based solid electrolyte is improved by this coating.

Typically, the fluorine-containing boric acid ester has a structure represented by the following formula (I).

[C1]

(I)

In the formula, at least one of $R_1$, $R_2$, and $R_3$ is an organic group including a fluorine atom, desirably $R_1$, $R_2$, and $R_3$ are each independently an organic group including a fluorine atom. $R_1$, $R_2$, and $R_3$ are each more desirably an aliphatic hydrocarbon group having a fluorine atom (for example, an alkyl group, an alkenyl group, an alkynyl group, or an aryl group), and still more desirably an alkyl group having a fluorine atom. The carbon number of $R_1$, $R_2$, and $R_3$ is desirably 1 to 10, more desirably 2 to 5, and still more desirably 2 to 3. It is desirable that the number of fluorine atoms be larger than the number of carbon atoms in the fluorine-containing boric acid ester.

Examples of the fluorine-containing boric acid ester include tris(2-monofluoroethyl) borate, tris(2,2-difluoroethyl) borate, tris(2,2,2-trifluoroethyl) borate, tris(2,2,3,3-tetrafluoropropyl) borate, tris(2,2,3,3,3-pentafluoropropyl) borate, tris(hexafluoroisopropyl) borate, tris(2,2,3,3,4,4,5,5-octafluoropentyl) borate, tris(2,2,2,3,3,4,4,5,5-nonafluoropentyl) borate, and the like. Among these, tris(2,2,2-trifluoroethyl) borate and tris(hexafluoroisopropyl) borate are desirable from the viewpoint of further reducing the battery resistance. The fluorine-containing boric acid esters may be used singly or in combination of two or more thereof.

In the lithium ion secondary battery 100, it is desirable that the molar ratio of the fluorine-containing boric acid ester to the phosphate-based solid electrolyte (fluorine-containing boric acid ester/phosphate-based solid electrolyte) be at least 0.05 and not more than 3. When the molar ratio (fluorine-containing boric acid ester/phosphate-based solid electrolyte) is within this range, capacity deterioration of the lithium ion secondary battery 100 can be further suppressed. Thus, it is possible to obtain a capacity deterioration suppressing effect which is higher than the capacity deterioration suppressing effect obtained by adding only the phosphate-based solid electrolyte. From the viewpoint of further reducing the battery resistance, the molar ratio (fluorine-containing boric acid ester/phosphate-based solid electrolyte) is desirably at least 0.1 and not more than 3, and more desirably at least 0.5 and not more than 3. From the viewpoint of balancing the battery resistance reducing effect and the capacity deterioration suppressing effect, the molar ratio (fluorine-containing boric acid ester/phosphate-based solid electrolyte) is desirably at least 0.1 and not more than 1.

The nonaqueous electrolytic solution may include various additives as long as the effect of the present teaching is not impaired, examples of the additives including a gas generating agent such as biphenyl (BP) or cyclohexylbenzene (CHB); an oxalato complex compound including a boron atom and/or a phosphorus atom; a film forming agent such as vinylene carbonate (VC); a dispersing agent; a thickening agent and the like.

The lithium ion secondary battery 100 configured as described above can be used for various purposes. Suitable applications include a drive power supply mounted on a vehicle such as an electric vehicle (EV), a hybrid vehicle (HV), or a plug-in hybrid vehicle (PHV). Typically, the lithium ion secondary battery 100 can also be used in the form of a battery pack in which a plurality of lithium ion secondary batteries is connected in series and/or in parallel.

The rectangular lithium ion secondary battery 100 including the flat wound electrode body 20 has been described as an example. However, the lithium ion secondary battery can also be configured as a lithium ion secondary battery including a stacked electrode body. Further, the lithium ion secondary battery can also be configured as a cylindrical lithium ion secondary battery.

Hereinafter, examples relating to the present teaching will be described, but the present teaching is not intended to be limited to the features shown in the examples.

Preparation of Lithium Ion Secondary Battery for Evaluation

Preparation of Battery No. 1

$LiNi_{0.5}Mn_{1.5}O_4$ (LNM) as a positive electrode active material powder, acetylene black (AB) as a conductive material, and polyvinylidene fluoride (PVdF) as a binder were mixed with N-methylpyrrolidone (NMP) at a mass ratio of LNM:AB:PVdF=87:10:3 to prepare a slurry for forming a positive electrode active material layer. This slurry was band-like applied to both sides of an elongated aluminum foil, dried, and then roll pressed until the density of the positive electrode active material layer became 2.3 g/cm³ to prepare a positive electrode sheet.

Further, natural graphite having an average particle diameter (D50) of 10 μm, a specific surface area of 4.8 m²/g, $C_0$=0.67 nm, and $L_c$=27 nm was prepared as a negative electrode active material. The natural graphite (C), styrene butadiene rubber (SBR) as a binder, and carboxymethyl cellulose (CMC) as a thickener were mixed with ion-exchanged water at a mass ratio of C:SBR:CMC=98:1:1 to prepare a slurry for forming a negative electrode active material layer. The slurry was band-like applied to both sides of an elongated copper foil, dried, and then subjected to roll pressing to prepare a negative electrode sheet.

The coating amount was adjusted so that the mass ratio of the positive electrode active material and the negative electrode active material was 2:1.

Two separator sheets (porous polyolefin sheet) were also prepared.

The prepared positive electrode sheet and negative electrode sheet were arranged opposite each other with the separator sheets interposed therebetween to prepare an electrode body.

Current collectors were attached to the prepared electrode body, and the electrode body was accommodated together with a nonaqueous electrolytic solution in a laminate case and sealed. The nonaqueous electrolytic solution was prepared by dissolving $LiPF_6$ as a supporting salt at a concentration of 1.0 mol/L in a mixed solvent containing monofluoroethylene carbonate (MFEC) and methyltrifluoroethyl carbonate (MTFEC) in a volume ratio of 30:70.

In this way, a lithium ion secondary battery No. 1 was fabricated.

Preparation of Battery No. 2

$LiNi_{0.5}Mn_{1.5}O_4$ (LNM) as a positive electrode active material powder, $Li_3PO_4$ as a phosphate-based solid electrolyte, acetylene black (AB) as a conductive material, and polyvinylidene fluoride (PVdF) as a binder were mixed with N-methylpyrrolidone (NMP) at a mass ratio of LNM+$Li_3PO_4$:AB:PVdF=87:10:3 to prepare a slurry for forming a positive electrode active material layer. This slurry was band-like applied to both sides of an elongated aluminum foil, dried, and then roll pressed until the density of the positive electrode active material layer became 2.3 g/cm³ to prepare a positive electrode sheet. In this case, $Li_3PO_4$ was added to LNM at 3% by mass.

Further, natural graphite having an average particle diameter (D50) of 10 μm, a specific surface area of 4.8 m²/g, $C_0$=0.67 nm, and $L_c$=27 nm was prepared as a negative electrode active material. The natural graphite (C), styrene butadiene rubber (SBR) as a binder, and carboxymethyl cellulose (CMC) as a thickener were mixed with ion-exchanged water at a mass ratio of C:SBR:CMC=98:1:1 to prepare a slurry for forming a negative electrode active material layer. The slurry was band-like applied to both sides of an elongated copper foil, dried, and then subjected to roll pressing to prepare a negative electrode sheet.

The coating amount was adjusted so that the mass ratio of the positive electrode active material and the negative electrode active material was 2:1.

Two separator sheets (porous polyolefin sheets) were also prepared.

The prepared positive electrode sheet and negative electrode sheet were arranged opposite each other with the separator sheets interposed therebetween to prepare an electrode body.

Current collectors were attached to the prepared electrode body, and the electrode body was accommodated together with a nonaqueous electrolytic solution in a laminate case and sealed. The nonaqueous electrolytic solution was prepared by dissolving $LiPF_6$ as a supporting salt at a concentration of 1.0 mol/L in a mixed solvent containing monofluoroethylene carbonate (MFEC) and methyltrifluoroethyl carbonate (MTFEC) in a volume ratio of 30:70.

In this way, lithium ion secondary battery No. 2 was fabricated.

Preparation of Battery No. 3

$LiNi_{0.5}Mn_{1.5}O_4$ (LNM) as a positive electrode active material powder, $Li_3PO_4$ as a phosphate-based solid electrolyte, acetylene black (AB) as a conductive material, and polyvinylidene fluoride (PVdF) as a binder were mixed with N-methylpyrrolidone (NMP) at a mass ratio of LNM+Li$_3$PO$_4$:AB:PVdF=87:10:3 to prepare a slurry for forming a positive electrode active material layer. This slurry was band-like applied to both sides of an elongated aluminum foil, dried, and then roll pressed until the density of the positive electrode active material layer became 2.3 g/cm$^3$ to prepare a positive electrode sheet. In this case, Li$_3$PO$_4$ was added to LNM at 3% by mass.

Further, natural graphite having an average particle diameter (D50) of 10 µm, a specific surface area of 4.8 m$^2$/g, C$_0$=0.67 nm, and L$_c$=27 nm was prepared as a negative electrode active material. The natural graphite (C), styrene butadiene rubber (SBR) as a binder, and carboxymethyl cellulose (CMC) as a thickener were mixed with ion-exchanged water at a mass ratio of C:SBR:CMC=98:1:1 to prepare a slurry for forming a negative electrode active material layer. The slurry was band-like applied to both sides of an elongated copper foil, dried, and then subjected to roll pressing to prepare a negative electrode sheet.

The coating amount was adjusted so that the mass ratio of the positive electrode active material and the negative electrode active material was 2:1.

Two separator sheets (porous polyolefin sheet) were also prepared.

The prepared positive electrode sheet and negative electrode sheet were arranged opposite each other with the separator sheets interposed therebetween to prepare an electrode body.

Current collectors were attached to the prepared electrode body, and the electrode body was accommodated together with a nonaqueous electrolytic solution in a laminate case and sealed. The nonaqueous electrolytic solution was prepared by dissolving LiPF$_6$ as a supporting salt at a concentration of 1.0 mol/L in a mixed solvent containing monofluoroethylene carbonate (MFEC) and methyltrifluoroethyl carbonate (MTFEC) in a volume ratio of 30:70, and further including tris(2,2,2-trifluoroethyl) borate (TFEB) as a boric acid ester so as to be 0.05 molar times the phosphate-based solid electrolyte.

In this way, lithium ion secondary battery No. 3 was fabricated.

Batteries No. 4 to 8

Lithium ion secondary batteries No. 4 to 8 were fabricated in the same manner as the lithium ion secondary battery No. 3, except that the amount added of tris(2,2,2-trifluoroethyl) borate (TFEB) as a boric acid ester was changed to the amount shown in Table 1.

Battery No. 9

A lithium ion secondary battery No. 9 was fabricated in the same manner as the lithium ion secondary battery No. 3, except that tris(hexafluoroisopropyl) borate (TFiPB) was used as a boric acid ester and the amount added of the boric acid ester was changed to the amount shown in Table 1.

Battery No. 10

A lithium ion secondary battery No. 10 was fabricated in the same manner as the lithium ion secondary battery No. 3, except that triethylborate (TEB) was used as a boric acid ester and the amount added of the boric acid ester was changed to the amount shown in Table 1.

Battery No. 11

A lithium ion secondary battery No. 11 was fabricated in the same manner as the lithium ion secondary battery No. 3, except that the entire Li$_3$PO$_4$ as a phosphate-based solid electrolyte was replaced with a positive electrode active material (LiNi$_{0.5}$Mn$_{1.5}$O$_4$) (that is, the phosphate-based solid electrolyte was not used), and tris(2,2,2-trifluoroethyl) borate (TFEB) as a boric acid ester was used in the same amount as in the lithium ion secondary battery No. 5.

Conditioning

Each of the prepared lithium ion secondary batteries was placed in an environment of 25° C. As conditioning, three cycles of charging and discharging were performed in which the cycle includes constant-current charging to 4.9 V at a current value of ⅓C, then rest for 10 min, then constant-current discharging to 3.5 V at a current value of ⅓C, and rest for 10 min.

Battery Resistance Measurement

Each of the conditioned lithium ion secondary batteries was adjusted to SOC 60%. The battery was placed in an environment at 25° C. and discharged for 10 sec. The discharge current rates were 1 C, 3 C, 5 C and 10 C, and the voltage after discharging at each current rate was measured. The IV resistance was calculated from the current rate and voltage, and the average value was taken as battery resistance. The results are shown in Table 1.

Evaluation of Charge/Discharge Cycle Properties

The discharge capacity at the time of discharge in the third cycle during conditioning was measured and this was taken as the initial capacity.

Subsequently, each lithium ion secondary battery was placed in an environment of 60° C. Charging and discharging were repeated 200 cycles, one cycle including constant-current charging at 2 C up to 4.9 V and constant-current discharging at 2 C to 3.5 V. Thereafter, each lithium ion secondary battery for evaluation was placed in an environment at 25° C., followed by constant-current charging to 4.9 V at a current value of ⅓C, then rest for 10 min, and then constant-current discharging to 3.5 V at a current value of ⅓C. The discharge capacity at this time was obtained as the battery capacity after 200 cycles of charging and discharging. The capacity deterioration rate (%) was obtained as [1−(Battery capacity after 200 cycles of charging and discharging)/(Initial capacity)]×100. The results are shown in Table 1.

TABLE 1

| Battery No. | Li$_3$PO$_4$ addition | Boric acid ester | Boric acid ester/Li$_3$PO$_4$ (molar ratio) | Battery resistance (Ω) | Capacity retention ratio (%) |
|---|---|---|---|---|---|
| 1 | No | No | — | 1.4 | 77 |
| 2 | Yes | No | — | 2.0 | 90 |
| 3 | Yes | TFEB | 0.05 | 1.8 | 89 |
| 4 | Yes | TFEB | 0.1 | 1.6 | 89 |
| 5 | Yes | TFEB | 0.5 | 1.3 | 88 |
| 6 | Yes | TFEB | 1 | 1.3 | 88 |
| 7 | Yes | TFEB | 3 | 1.3 | 85 |
| 8 | Yes | TFEB | 5 | 1.4 | 73 |
| 9 | Yes | TFiPB | 0.5 | 1.4 | 86 |
| 10 | Yes | TEB | 0.5 | 2.0 | 88 |
| 11 | No | TFEB | (0.5) | 1.4 | 70 |

By comparing the lithium ion secondary battery No. 1 with the lithium ion secondary battery No. 2, it is understood that inclusion of the phosphate-based solid electrolyte in the positive electrode active material layer improves the capacity retention rate while increasing the battery resistance.

By comparing the lithium ion secondary battery No. 1 with the lithium ion secondary battery No. 11, it is understood that the capacity retention rate decreases when the fluorine-containing boric acid ester is added without adding the phosphate-based solid electrolyte.

In contrast, it can be understood from the evaluation results relating to the lithium ion secondary batteries No. 3 to 8 that by adding tris(2,2,2-trifluoroethyl) borate (TFEB), which is a fluorine-containing boric acid ester, to the nonaqueous electrolytic solution, it is possible to achieve target reduction in battery resistance. Further, from the viewpoint of high capacity retention ratio, it is found that the desired molar ratio (fluorine-containing boric acid ester/phosphate-based solid electrolyte) is at least 0.05 and not more than 3.

From the evaluation result of the lithium ion secondary battery No. 9, it is understood that even when the type of the fluorine-containing boric acid ester is changed, it is possible to achieve target reduction in battery resistance.

Meanwhile, from the evaluation results of the lithium ion secondary battery No. 10, it is understood that when the boric acid ester does not contain a fluorine atom, it is not possible to achieve the target reduction in battery resistance.

Although specific examples of the present teaching have been described in detail above, they are merely examples and do not limit the scope of the claims. The features described in the claims include those in which the specific examples illustrated above are variously modified and changed.

What is claimed is:

1. A lithium ion secondary battery comprising: a positive electrode, a negative electrode, and a nonaqueous electrolytic solution, wherein the positive electrode has a positive electrode active material layer includes a positive electrode active material having an operation upper limit potential of at least 4.6 V relative to metallic lithium and a phosphate-based solid electrolyte;

the nonaqueous electrolytic solution includes a boric acid ester including a fluorine atom;

the boric acid ester includes a fluorine atom includes tris(2,2,2-trifluoroethyl)borate;

a molar ratio of the boric acid ester including a fluorine atom to the phosphate-based solid electrolyte is at least 0.05 and not more than 3; and the nonaqueous electrolytic solution includes a fluorinated carbonate as a nonaqueous solvent.

2. The lithium ion secondary battery according to claim 1, wherein a molar ratio of the boric acid ester including a fluorine atom to the phosphate-based solid electrolyte is at least 0.1 and not more than 1.

3. The lithium ion secondary battery according to claim 1, wherein a molar ratio of the tris(2,2,2-trifluoroethyl)borate to the phosphate-based solid electrolyte is at least 0.05 and not more than 3.

\* \* \* \* \*